US007335710B2

(12) United States Patent
Chai et al.

(10) Patent No.: US 7,335,710 B2
(45) Date of Patent: Feb. 26, 2008

(54) POLYMERIZATION PROCESS

(75) Inventors: Choon Kooi Chai, Cabries (FR); Brian Stephen Kimberley, Bouches du Rhone (FR); Sergio Mastroianni, Martigues (FR)

(73) Assignee: Ineos Europe Limited, Hampshire (GB)

( * ) Notice: Subject to any disclaimer, the term of this patent is extended or adjusted under 35 U.S.C. 154(b) by 0 days.

(21) Appl. No.: 11/347,237

(22) Filed: Feb. 6, 2006

(65) Prior Publication Data

US 2006/0128909 A1  Jun. 15, 2006

Related U.S. Application Data

(62) Division of application No. 10/495,916, filed as application No. PCT/GB02/05160 on Nov. 14, 2002, now abandoned.

(30) Foreign Application Priority Data

Nov. 20, 2001  (EP) ................... 01430035

(51) Int. Cl.
 C08F 4/6392 (2006.01)
 C08F 4/6592 (2006.01)
(52) U.S. Cl. ...................... 526/127; 526/132; 526/134; 526/160; 526/161

(58) Field of Classification Search ................ 526/127, 526/132, 134, 160, 161
See application file for complete search history.

(56) References Cited

U.S. PATENT DOCUMENTS 5,773,155 A  6/1998 Kale et al.

FOREIGN PATENT DOCUMENTS

| EP | 0 515 132 A2 | 11/1992 |
|---|---|---|
| WO | WO 93/09148 A1 | 5/1993 |
| WO | WO 95/00526 A1 | 1/1995 |
| WO | WO99/15534 * | 4/1999 |
| WO | WO 99/15534 A1 | 4/1999 |
| WO | WO 00/15672 A1 | 3/2000 |
| WO | WO 00/71587 A1 | 11/2000 |
| WO | WO 02/28921 A1 | 4/2002 |

* cited by examiner

*Primary Examiner*—Roberto Rabago
(74) *Attorney, Agent, or Firm*—Finnegan, Henderson, Farabow, Garrett, & Dunner, L.L.P.

(57) ABSTRACT

A process for the polymerisation of olefins is described involving the use of a catalyst system comprising a supported transition metal compound and an activator based on an organoborane and an aluminoxane. Preferably the transition metal compound is a metallocene complex. The support is pretreated with an organoaluminium compound and the process is particularly suitable for the gas phase preparation of copolymers of ethylene and alpha-olefins having a molecular weight distribution in the range 2.5-7.0 and a melt strength in the range 3-12 cN.

6 Claims, No Drawings

POLYMERIZATION PROCESS

RELATED APPLICATION

This application is a divisional of U.S. application Ser. No. 10/495,916 filed May 18, 2004 now abandoned, which is a §371 of International Application No. PCT/GB02/05160 filed Nov. 14, 2002.

BACKGROUND OF THE INVENTION

The present invention relates to a process for polymerizing olefins and in particular to a process for the polymerization of olefins using a supported catalyst composition comprising a transition metal compounds and an activator comprising an aluminoxane and an organoboron compound. The process is particularly suitable for operation in the gas phase and preferred transition metal compounds are metallocene complexes.

The process according to the present invention is also particularly suitable for the preparation in the gas phase of copolymers having an improved melt strength.

In recent years there have been many advances in the production of polyolefin copolymers due to the introduction of transition metal compounds and in particular metallocene catalysts. Metallocene catalysts offer the advantage of generally higher activity than traditional Ziegler catalysts and are usually described as catalysts which are single-site in nature. Because of their single-site nature the polyolefin copolymers produced by metallocene catalysts often are quite uniform in their molecular structure. For example, in comparison to traditional Ziegler produced materials, they have relatively narrow molecular weight distributions (MWD) and narrow Short Chain Branching Distribution (SCBD). Although certain properties of metallocene products are enhanced by narrow MWD, difficulties are often encountered in the processing of these materials into useful articles and films relative to Ziegler produced materials. In addition, the uniform nature of the SCBD of metallocene produced materials does not readily permit certain structures to be obtained.

The use of these metal complex based olefin polymerisation catalysts is now well established. Typically the metallocene complex comprises a bis(cyclopentadienyl)zirconium complex for example bis(cyclopentadienyl)zirconium dichloride or bis(tetramethylcyclopentadienyl)zirconium dichloride. Examples of such complexes may be found in EP 129368, EP 206794, and EP 260130.

In such catalyst systems the metal complex is used in the presence of a suitable activator. The activators most suitably used with such metallocene complexes are aluminoxanes, most suitably methyl aluminoxane (MAO). Other suitable activators are boron compounds, in particular perfluorinated boron compounds.

More recently complexes having a single or mono cyclopentadienyl ring have been developed. Such complexes have been referred to as 'constrained geometry' complexes and examples of these complexes may be found in EP 416815 or EP 420436. In such complexes the metal atom eg. zirconium or titanium is in the highest oxidation state.

Other complexes however have been more recently developed in which the metal atom may be in a reduced oxidation state. Examples of both the bis(cyclopentadienyl) and mono (cyclopentadienyl) complexes have been described in WO 96/04290 and WO 95/00526 respectively.

The above monocyclopentadienyl metallocene complexes are utilised for polymerisation in the presence of a cocatalyst or activator. Typically activators are aluminoxanes, in particular methyl aluminoxane or compounds based on boron compounds. Examples of the latter are boranes, for example tris(pentafluorophenyl)borane, or borates such as trialkyl-substituted ammonium tetraphenyl- or tetrafluorophenyl-borates. Catalyst systems incorporating such borate activators are described in EP 561479, EP 418044 and EP 551277.

When used for the gas phase polymerisation of olefins, metallocene complexes may typically be supported for example on an inorganic oxide such as silica. Such supports may be typically dehydrated by calcining before use or may be pretreated with an organoaluminium compound to passivate the surface of the silica.

Numerous references have described the use of supported metallocene catalyst compositions for use in the gas phase polymerisation of olefins. A number have also described the combination of more than one activator with such supported metallocene complexes.

The aforementioned WO 95/00526 describes in general terms the use of the reduced oxidation state monocyclopentadienyl complexes with both aluminoxane and borane activators. Although supported catalyst systems are described, all the examples of gas phase polymerisations with supported catalysts are limited to the use of a single activator, typically tris(pentafluorophenyl)borane.

WO 99/15534 describes the combination of aluminoxanes with a fluoroaryl ligand source such as tris(pentafluorophenyl)borane as activators for metallocene complexes. When supported the activator combinations may be used for the gas phase polymerisation of olefins. The gas phase examples in the reference utilise silica supports that have been calcined prior to contact with the activator components.

WO 00/15672 describes functionalized catalyst supports having chemically bonded aluminium containing groups prepared by the combination of supports having reactive functional groups with a source of aluminium. Where exemplified, in the gas phase, the use of aluminoxane/borane activator combinations are supported on silica which has been dehydrated.

SUMMARY OF THE INVENTION

We have now surprisingly found that when used with supports, pretreated with an organoaluminium compound, the combinations of aluminoxane and organoboron activators may be used with transition metal compounds for the polymerisation of olefins leading to products which exhibit an improved melt strength.

Thus according to the present invention there is provided an olefin polymerisation process comprising contacting one or more olefin monomers with a supported catalyst composition prepared by contacting (a) a transition metal compound,
(b) a support, and
(c) an activator comprising (i) an aluminoxane and (ii) an organoboron compound, characterised in that the support is pretreated with an organoaluminium compound.

DETAILED DESCRIPTION OF THE INVENTION

Aluminoxanes are well known as activators for metallocene comlexes. Suitable aluminoxanes, for use in the process of the present invention, include polymeric or oligomeric aluminoxanes in particular methyl aluminoxane (MAO).

The aluminoxanes suitable for use in the present invention may be commercially available material or may be such commercially available material that has been dried under vacuum prior to its use for the preparation of the supported catalyst compositions.

Preferred organoboron compounds are triarylboron compounds, in particular perfluorinated triarylboron compounds.

The most preferred organoboron compound is tris(pentafluorophenyl)borane (FAB).

The aluminoxanes and organoboron compounds suitable for use in the process of the present invention are well known in the art and are described for example in EP 277003, EP 206794, and the aforementioned WO 95/00526.

The ratio of boron/transition metal in the supported metallocene complexes of the present invention is typically in the range 0.1 to 10 and most preferably in the range 1 to 4.

The pretreatment of the support with the organoaluminium compound results in a support in which the organoaluminium compound is not chemically bonded.

The support may be any organic or inorganic inert solid. However particularly porous supports such as talc, inorganic oxides and resinous support materials such as polyolefins, which have well-known advantages in catalysis, are preferred. Suitable inorganic oxide materials which may be used include Group 2, 13, 14 or 15 metal oxides such as silica, alumina, silica-alumina and mixtures thereof.

Other inorganic oxides that may be employed either alone or in combination with the silica, alumina or silica-alumina are magnesia, titania or zirconia. Other suitable support materials may be employed such as finely divided polyolefins such as polyethylene.

The most preferred support material for use with the supported catalysts according to the process of the present invention is silica. Suitable silicas include Crossfield ES70 and Davidson 948 silicas.

The support material may be subjected to a heat treatment to reduce the water content or the hydroxyl content of the support material. For example prior to its use the support material may be subjected to treatment at 100° C. to 1000° C. and preferably at 200 to 850° C. in an inert atmosphere under reduced pressure, for example, for 5 hrs.

The support material is pretreated with an organoaluminium compound, for example a trialkylaluminium compound, at a temperature of −20° C. to 150° C. and preferably at 20° C. to 100° C.

Most preferably the support material is contacted with the organoaluminium compound at room temperature in a suitable solvent, for example hexane.

Preferred trialkylaluminium compounds are triethylaluminium and triisobutylaluminium.

The pretreated support is preferably recovered before use in the preparation of the supported catalysts used in the process of the present invention.

The transition metal compound may be any suitable compound known in the art for use as a catalyst component for the polymerisation of olefins.

The preferred transition metal compounds are metallocene complexes.

Typically the metallocene complex comprises a bis(cyclopentadienyl)zirconium complex for example bis(cyclopentadienyl)zirconium dichloride or bis(tetramethylcyclopentadienyl)zirconium dichloride. Examples of such complexes may be found in EP 129368, EP 206794, and EP 260130.

Particularly preferred metallocene complexes are monocyclopentadienyl complexes. Such complexes have been referred to as 'constrained geometry' complexes and examples of these complexes may be found in EP 416815 or EP 420436.

The preferred monocyclopentadienyl metallocene complexes have the formula

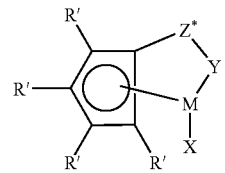

wherein:

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π complex with M;

Y is —O—, —S—, —NR*—, —PR*—,

M is titanium or zirconium in the +2 formal oxidation state;

Z* is SiR*$_2$, CR*$_2$, SiR*$_2$SIR*$_2$, CR*$_2$CR*$_2$, CR*=CR*, CR*$_2$SIR*$_2$, or

GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire C$_5$R'$_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is C$_{1-10}$ hydrocarbyl.

Most preferred complexes are amidosilane- or amidoalkanediyl complexes.

Most preferred complexes are those wherein M is titanium.

Specific complexes suitable for use in the process according to the present invention are those disclosed in the aforementioned WO 95/00526, the relevant parts of which are incorporated herein by reference.

A particularly preferred complex for use in the present invention is (t-butylamido) (tetramethyl-$\eta^5$-cyclopentadienyl)dimethyl silanetitanium-$\eta^4$-1,3-pentadiene.

In another embodiment of the present invention the support may be pretreated with the aluminoxane before contact with the other catalyst components. In this embodiment the preferred supported catalyst systems for use in the process of the present invention may be prepared by (a) addition of an aluminoxane to a support,
(b) addition to the supported aluminoxane mixture from step (a) of a transition metal compound, and
(c) addition of an organoborane compound to the resultant mixture from step (b).

Suitable transition metal compounds are as hereinbefore described but preferably the transition metal compound is a monocyclopentadienyl metallocene complex.

The supported catalyst compositions of the present invention may be suitable for use in any polymerisation process for example solution, slurry or gas phase.

The preferred process is a gas phase process.

The preferred gas phase process takes place continuously in a fluidised bed.

The continuous polymerisation is effected in the gas phase at elevated temperature in the presence of a fluidised bed of polymer particles and continuous recycle of unreacted monomer(s) around a loop joining the inlet and outlet of the reactor containing the fluidised bed. Examples of two possible approaches are described in EP 89961, U.S. Pat. Nos. 53,527,947 and 5,541,270 the complete texts of which are herein incorporated by reference. EP 699213 also illustrates a possible approach and again the complete text of this publication is incorporated by reference.

The process of the present invention is suitable for the polymerisation of ethylene or the copolymerisation of ethylene with one or more alpha-olefins having from three to twenty carbon atoms. Preferably the alpha-olefin has between three and ten carbon atoms most preferably three and eight. Examples of the most preferred alpha olefins include 1-butene, 1-hexene, 4-methyl-1-pentene, 1-octene.

The process of the present invention is most particularly directed to the preparation of copolymers of ethylene with alpha-olefins having at least 6 carbon atoms in particular to copolymers of ethylene with 1-hexene or 4-methyl-1-pentene.

The polymers prepared according to the process of the present invention have a molecular weight distribution (Mw/Mn) value of less than 7 and most preferably less than 5.

The preferred molecular weight distribution (Mw/Mn) is in the range 2.5 to 7.0 and preferably in the range 3.0-5.0.

The polymers prepared according to the process of the present invention exhibit an improved melt strength and typically have values in the range 3-12 cN and preferably in the range 6-9 cN.

The copolymers are preferably prepared by use of a supported metallocene catalyst system as hereinbefore described.

Thus according to another aspect of the present invention there is provided a process for the preparation of copolymers of ethylene and alpha-olefins having (a) a melt strength in the range 3-12 cN, and
(b) a molecular weight distribution (Mw/Mn) in the range 2.5-7. said process comprising comprising contacting ethylene and one or more alpha-olefins in the presence of a supported metallocene complex.

The preferred catalyst system for this aspect of the present invention is a monocyclopentadienyl complex as hereinbefore described.

The preferred process for the preparation of such copolymers is a gas phase process.

The process of the present invention will now be illustrated by reference to the following examples. Examples 1-4 illustrate the preparative routes to the supported catalyst compositions used in the process of the present invention. Examples 5-9 illustrate the use of the supported catalyst compositions for the gas phase polymerisation of olefins.

EXAMPLES

Abbreviations Used

FAB trispentafluorophenylborane $B(C_6F_5)_3$
MAO methylaluminoxane
TEA triethylaluminium
TiBA trisobutylaluminum All catalyst preparation steps were performed in a inert atmosphere filled glove-box using standard Schlenk and cannulae techniques.

Example 1

Preparation of Support Material

To 5.367 g of silica Grace 948 (previously calcined at 250° C. for 5 hours) in (hexane) was added a solution of triethylaluminium (TEA) in hexane (1.06 mol/l, 10 ml, 10.6 mmol). The mixture was allowed to react for 30 minutes then the liquid fraction was filtered and the remaining solid was washed with 3×20 ml of hexane and finally dried under vacuum.

[Al]=1.45 mmol/g of support (measured by ICP).

Preparation of Metallocene/Activator

To 30 ml of toluene were added 6.367 g of a 6.12 wt % toluene solution of tris(pentafluorophenyl)boron (FAB) (0.761 mmol) and 3.148 g of a 10 wt % toluene solution of methyl aluminoxane (MAO) (5.43 mmol). To 15 ml. of the resultant mixture was added 0.494 g of a 9.17 wt % heptane solution of (t-butylamido) (tetramethyl-$\eta^5$-cyclopentadienyl)dimethyl silanetitanium-$\eta^4$-1,3-pentadiene (0.695 ml, 0.12 mmol) and the reaction mixture stirred for 2 hrs. at room temperature. B/Ti ratio=3.1

Preparation of Supported Catalyst

To a suspension of the support material (1.975 g) in toluene (10 ml) was added the metallocene/activator mixture. The resultant mixture was allowed to react for 1 hour at room temperature, then dried under vacuum. A green-beige free flowing powder was obtained.

[Ti]=0.046 mmol/g catalyst; [Al]=1.73 mmol/g catalyst

Example 2

Preparation of Support Material

To 5.367 g of silica Grace 948 previously calcined at 250° C. for 5 hours) in (hexane) was added a solution of triethylaluminium (TEA) in hexane (1.06 mol/l, 10 ml, 10.6 mmol). The mixture was allowed to react for 30 minutes then the liquid fraction was filtered and the remaining solid was washed with 3×20 ml of hexane and finally dried under vacuum.

[Al]=1.45 mmol/g of support (measured by ICP).

Preparation of Dried Methyl Aluminoxane 54 g of 10% wt. Solution of commercially available MAO was dried under vacuum to give 3.58 g of white solid.

Preparation of Metallocene/Activator

To 40 ml of toluene were added 6.236 g of a 6.12 wt % toluene solution of tris(pentafluorophenyl)boron (FAB) (0.742 mmol) and 0.34 g of the dried methyl aluminoxane (MAO) (5.86 mmol). To 20 ml. of the resultant mixture was added 0.420 g of a 9.17 wt % heptane solution of (t-butylamido) (tetramethyl-$\eta^5$-cyclopentadienyl)dimethyl silanetitanium-$\eta^4$-1,3-pentadiene (0.592 ml, 0.11 mmol) and the reaction mixture stirred for 2 hrs. at room temperature. B/Ti ratio=3.

Preparation of Supported Catalyst

To a suspension of the support material (3.044 g) in toluene (20 ml) was added the metallocene/activator mixture. The resultant mixture was allowed to react for 1 hour at room temperature, then dried under vacuum. A green-beige free flowing powder was obtained.

[Ti]=0.021 mmol/g catalyst; [Al]=1.62 mmol/g catalyst

Example 3

To 2.53 g of silica Grace 948 (previously calcined at 250° C. for 5 hours) in 15 ml of hexane was added over 10 minutes a solution of TiBA in hexane (0.952 mol/l, 3.45 ml, 3.289 mmol). The mixture was allowed to react for 2 hours. 1.35 ml of 10% wt MAO solution in toluene was the added, followed by the addition of 3.91 ml of FAB in toluene (6.12 wt %, 0.405 mmol). The reaction mixture was stirred for 2 hours. 0.76 ml of 9.17 wt % solution of (t-butylamido) (tetramethyl-$\eta^5$-cyclopentadienyl)dimethyl silanetitanium-$\eta^4$-1,3-pentadiene in heptane was then added (0.135 mmol) and the mixture was stirred for 1 hour. Volatiles were the removed under vacuum leading to green free flowing powder. B/Ti ratio=3.

[Ti]=0.048 mmol/g catalyst; [Al]=1.60 mmol/g catalyst.

Example 4

Preparation of Support Material

To 2.49 g of silica Grace 948 (previously calcined at 250° C. for 5 hours) in 24.95 g. of toluene was added 1.56 g. of dried methyl aluminoxane (see Example 2) and the mixture heated at 90° C. for 3.5 hrs. Volatiles were removed under vacuum and the solid washed 3 times with 10 ml. hexane, filtered followed by the addition of 12.85 g. toluene.

Preparation of Supported Metallocene Complex 0.395 g. of a 9.17 wt % of (t-butylamido) (tetramethyl-$\eta^5$-cyclopentadienyl)dimethyl silanetitanium-$\eta^4$-1,3-pentadiene in heptane was then added to the above support material and the mixture was stirred for 1.5 hrs at 45° C. Volatiles were removed under vacuum leading to a free flowing powder.

[Ti]=0.053 mmol/g catalyst; [Al]=4.59 mmol/g catalyst

Preparation of Supported Catalyst

To 0.994 g of the supported metallocene complex in 10 ml of toluene was added 0.441 g. of 6.12% wt. of tris(pentafluorophenyl)borane in toluene (0.053 mmol). The mixture was stirred for 5 hrs. at room temperature then the liquid was decanted and the solid phase dried under vacuum. B/Ti ratio=1.

Examples 5-9

Gas Phase Polymerizations

The following gas phase polymerisations were carried using the above supported catalyst compositions:

TABLE 1

| Example | Catalyst | Ethylene (bar) | 1-Hexene (ppm) | Hydrogen (ml) | Catalyst (g) | Time (hrs) |
|---------|----------|----------------|----------------|---------------|--------------|------------|
| 5 | Example 1 | 7.0 | 5000 | 40 | 0.5 | 1 |
| 6 | Example 1 | 7.0 | 5200 | 70 (3 additions) | 0.5 | 3 |
| 7 | Example 2 | 7.0 | 5000 | 40 | 0.5 | 1 |
| 8 | Example 3 | 6.5 | 4500 | 100 (3 additions) | 0.203 | 2.5 |
| 9 | Example 4 | 6.5 | 5000 | 40 | 0.474 | 1 |

The activities and the product characteristics are shown below in Table 2:

TABLE 2

| Example | Activity (g/g · hr/bar) | Melt Index (2.16 kg) g/10 min | Density (g/ml) | Ea (kJ/mol) | Mw/Mn | Melt Strength (16 Mpa) (cN) |
|---------|-------------------------|-------------------------------|----------------|-------------|-------|-----------------------------|
| 5 | 21 | 0.194 | 0.918 | 60.5 | 3.4 | |
| 6 | 17 | 0.54 | 0.913 | 35 | 3.1 | 7.0 |
| 7 | 19 | 0.811 | 0.923 | 36 | 3.6 | |
| 8 | 10.3 | 0.180 | 0.908 | 34 | 4.9 | 8.5 |
| 9 | 20 | 0.5 | 0.917 | 36 | 3.3 | 6.8 |

Product characteristics were determined using the following analytical procedures:

Melt Flow Rate (2.16 kg)

The melt flow rate (MFR) of the polymers was measured under conditions which conform to ISO 1133 (1991) and BS 2782:PART 720A:1979 procedures. The weight of polymer extruded through a die of 2.095 mm diameter, at a temperature of 190° C., during a 600 second time period and under a standard load of 2.16 kg is recorded.

Molecular Structure Characterisation

Various techniques (eg $^{13}$C NMR, GPC/LALLS, GPC/intrinsic viscosity, GPC/on-line viscometry and rheological flow activation energy, etc) have been developed to indicate the presence of long chain branching in polymers.

Molecular Weight Distribution ($M_w/M_n$)

Molecular weight distribution and associated averages, were determined by Gel Permeation Chromatography using a Waters GPCV 2000. The Millennium version 3.05.01 software supplied by Waters was used for data treatment. The solvent used was 1,2,4 Trichlorobenzene at 150° C., stabilised with 0.05% BHT. The nominal flow rate was 1 ml/min. Solutions of concentration around 0.1% w/w were prepared at 150° C. for 2 hours on a hot plate, and the nominal injection volume was set at 217.5 ml. 2 Shodex AT806M/S and 1 Waters HT2 columns were used with a plate count (at half height) of typically 28,000. The system was calibrated using 12 polystyrene standards supplied by Polymer Laboratories.

Apparent molecular weight distribution and associated averages, uncorrected for long chain branching, were determined using the differential refractometer detector alone. Molecular weight of Ps standards were converted to polyethylene molecular weights using the Mark Houwink parameters $K_{ps}=1.75 \times 10^{-4}$ dl/g, $\alpha_{ps}=0.67$, $K_{pe}=4.1 \times 10^{-4}$ dl/g, $\alpha_{pe}=0.706$ [Polymer Handbook, J. Bandrup and E. H. Immergut, 3$^{rd}$ Edition].

This calibration has been checked against the NIST certified polyethylene SRM1475, the values obtained being 54,100 g/mol for $M_w$ and 17,300 g/mol for $M_n$.

Flow Activation Energy (Ea) Measurement

Rheological measurements were carried out on a Rheometrics RDS-2 with 25 mm diameter parallel plates in the dynamic mode. Two strain sweep (SS) experiments were initially carried out to determine the linear viscoelastic strain that would generate a torque signal which is greater than 10% of the full scale (2000 g-cm) of the transducer over the full frequency (eg 0.01 to 100 rad/s) and temperature (eg 170° to 210° C.) ranges. The first SS experiment was carried out at the highest test temperature (eg 210° C.) with a low applied frequency of 0.1 rad/s. This test is used to determine the sensitivity of the torque at low frequency. The second experiment was carried out at the lowest test temperature (eg 170° C.) with a high applied frequency of 100 rad/s. This is to ensure that the selected applied strain is well within the linear viscoelastic region of the polymer so that the oscillatory rheological measurements do not induce structural changes to the polymer during testing. This procedure was carried out for all the samples.

The bulk dynamic rheological properties (eg G', G'' and $\eta^*$) of all the polymers were then measured at 170°, 190° and 210° C. At each temperature, scans were performed as a function of angular shear frequency (from 100 to 0.01 rad/s) at a constant shear strain appropriately determined by the above procedure.

The dynamic rheological data was then analysed using the Rheometrics RHIOS V4.4 Software. The following conditions were selected for the time-temperature (t-T) superposition and the determination of the flow activation energies ($E_a$) according to an Arrhenius equation, $a_T=\exp(E_a/kT)$, which relates the shift factor ($a_T$) to $E_a$:

| | |
|---|---|
| Rheological Parameters: | G'($\omega$), G''($\omega$) & $\eta^*(\omega)$ |
| Reference Temperature: | 190° C. |
| Shift Mode: | 2D (ie horizontal & vertical shifts) |
| Shift Accuracy: | High |
| Interpolation Mode: | Spline |

Melt Strength

The melt strength of the polymer is measured at 190° C., using a Göttfert Rheotens extensional rheometer in conjunction with a Rosand RH 7 Capillary Rheometer. This is achieved by extruding the polymer at a constant pressure (P) through a die of 1.5 mm diameter and 30 mm in length, with a 90° entry angle. Once a given extrusion pressure is selected, the piston of the capillary rheometer will travel through its 15 mm diameter barrel at a speed that is sufficient to maintain that pressure constant. The nominal wall shear rate ($\dot{\gamma}$) for a given extrusion pressure can then be computed for the polymer at the selected pressure using the constant pressure ratio system of the rheometer.

The extrudate is drawn with a pair of gear wheels at an accelerating speed (V). The acceleration ranges from 0.12 to 1.2 cm/s² depending on the flow properties of the polymer under test. The drawing force (F) experienced by the extrudate is measured with a transducer and recorded on a chart recorder together with the drawing speed. The maximum force at break is defined as melt strength (MS) at a constant extrusion pressure (P) or at its corresponding extrusion rate ($\dot{\gamma}$). Three or four extrusion pressures (6, 8, 12, 16 MPa) are typically selected for each polymer depending on its flow properties. For each extrusion pressure, a minimum of 3 MS measurements is performed and an average MS value is then obtained.

The derivative function of the extrusion pressure dependent melt strength, $\delta(MS)/\delta(P)$ for each polymer is computed from the slope (by a least square line fitting) of the plot of the average MS against pressure. The mean melt strength at an extrusion pressure of 16 MPa, MS (16 MPa), can be computed from the plot.

The invention claimed is:

1. A process for the preparation of copolymers of ethylene and alpha-olefins having
   (a) a melt strength in the range 3-12 cN, and
   (b) a molecular weight distribution (Mw/Mn) in the range 3.0-7.0,
   said process comprising polymerizing ethylene and one or more alpha-olefins in the gas phase in the presence of a supported metallocene complex that was prepared by the following steps:
   a) adding an aluminoxane to a support to form a supported aluminoxane mixture;
   b) adding to the supported aluminoxane mixture from step a) a monocyclopentadienyl metallocene complex to form a mixture; and
   c) adding to the mixture from step b) an organoborane compound.

2. The process according to claim 1, wherein the copolymers have
   (a) a melt strength in the range 6-9 cN, and
   (b) a molecular weight distribution (Mw/Mn) in the range 3.0-5.0.

3. The process according to claim 1, wherein the monocyclopentadienyl metallocene complex has the formula

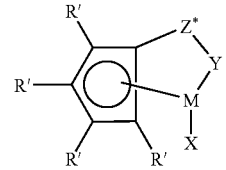

wherein:
R' each occurrence is independently selected from the group consisting of hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a $\pi$ complex with M;

Y is —O—, —S—, —NR*—, —PR*—,

M is titanium or zirconium in the +2 formal oxidation state;

Z* is SiR*$_2$, CR*$_2$, SiR*$_2$SIR*$_2$, CR*$_2$CR*$_2$, CR*=CR*, CR*$_2$SIR*$_2$, or GeR*2, wherein:

R* each occurrence is independently hydrogen, or a member selected from the group consisting of hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

4. The process according to claim 3, wherein the complex is a titanium complex.

5. The process according to claim 4, wherein the complex is (t-butylamido)(tetramethyl-$\eta^5$-cyclopentadienyl)dimethyl silanetitanium-$\eta^4$-1,3-pentadiene.

6. The process according to claim 1, wherein the support is silica.

* * * * *